(Model.)
J. KRITCH.
Machine for Shaping the Arms or Spindles of Axles.
No. 235,440. Patented Dec. 14, 1880.
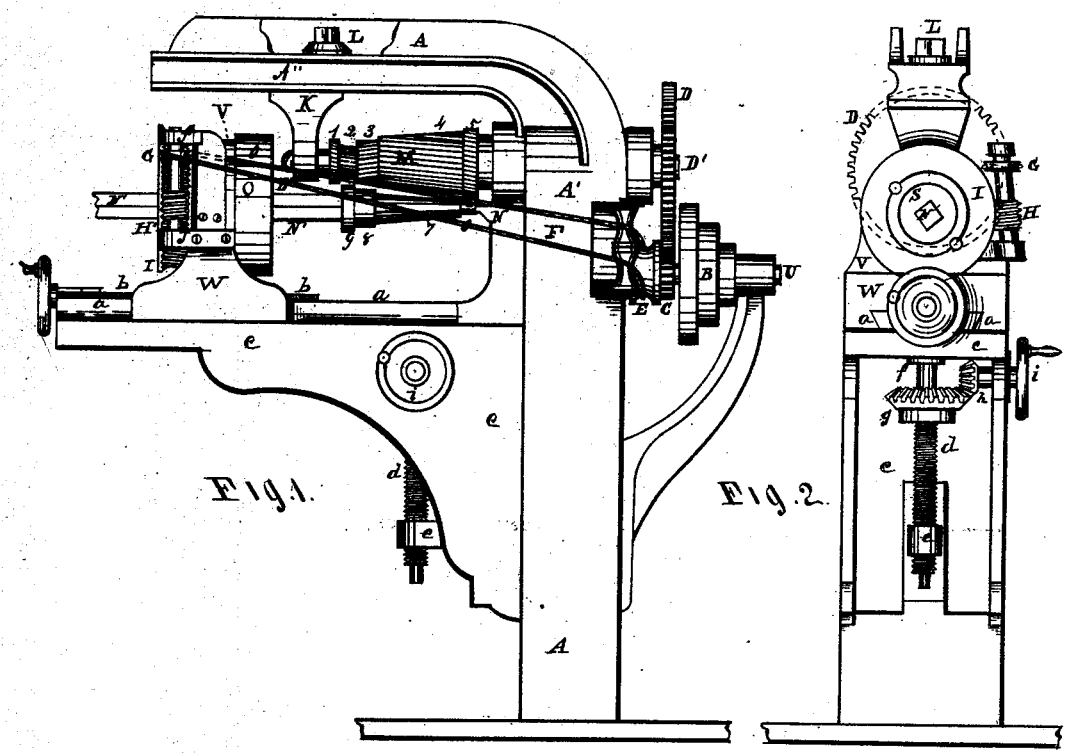
Fig. 1.
Fig. 2.
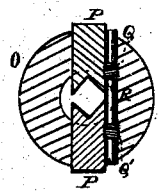
Fig. 3.
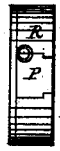
Fig. 4.
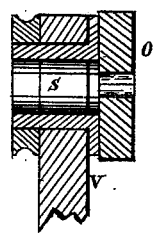
Fig. 5.
Witnesses.
Inventor.

UNITED STATES PATENT OFFICE.

JACOB KRITCH, OF CLEVELAND, OHIO, ASSIGNOR OF ONE-HALF TO FRANCIS D. BLISS, OF NEW HAVEN, CONNECTICUT.

MACHINE FOR SHAPING THE ARMS OR SPINDLES OF AXLES.

SPECIFICATION forming part of Letters Patent No. 235,440, dated December 14, 1880.

Application filed April 24, 1880. (Model.)

*To all whom it may concern:*

Be it known that I, JACOB KRITCH, of Cleveland, in the county of Cuyahoga and State of Ohio, have invented an Improved Machine for Shaping the Arms or Spindles of Axles; and I do hereby declare that the following is a full, clear, and complete description thereof.

The nature of my improvement relates to a machine or apparatus for the purpose of milling or reducing the axle-blank to the desired form and size ready for the box.

The ordinary way of shaping the axle-blank and fitting for the pipe or box is by centering the said blank, turning down the same in a lathe provided with suitable tools for this purpose. This mode is slow compared with my improvement, and it further requires much skill and close attention to turn down a lot of blank arms for axles to a uniform size, so as to fit the prepared boxes. For this purpose skilled labor and expense are required, and then there is more or less variation in the size or form of the axle, owing to the imperfection in the mechanism and skill employed.

The object of the improvement is to reduce the axle-blanks complete for the pipe or box by milling the same to such uniform exactness that the same series of axles will fit any one of the series of boxes dressed for this series and sized axles.

To enable those skilled in the art to which this invention appertains to fully understand the same, I will proceed to describe the construction and operation of said milling apparatus, reference being had to the following specification, and to the annexed drawings, in which—

Figure 1 is a side elevation; Fig. 2, an end view. Fig. 3 is a section transversely of the revolving head. Fig. 4 is a side view of the same. Fig. 5 is a vertical section of the revolving head and movable standard.

Like letters of reference refer to like parts in the several views.

The general form of the frame of the machine is seen at A, Fig. 1, which, however, may be modified as needed for this purpose.

The driving-cone B is mounted upon a shaft having its bearing at one end in a bracket or arm connected to the frame, and the other end resting in the upper part of the frame standard or head. On the said pulley-shaft is a pinion, C, which meshes into the gear-wheel D. The pulley E is also attached to the same shaft as pulleys B.

From the pulley E extends a belt, F, to the screw-pulley G, at the lower end of which is attached an endless screw, H, which works in the screw-wheel I, for a purpose hereinafter shown. Said screw-shaft is journaled at J J.

The shaft D', to which the gear D is attached, extends through the head A', in which it has its bearing, the opposite end being journaled in the sliding bracket K, the upper end of which is provided with a screw and nut at L, for securing it and holding the shaft D', with its attachments, in place at this end, the outer end of the shaft being supported in the head A'.

Upon the shaft D' is mounted and secured the milling-cutter M, which may be either made up in one entire piece or in sections 1, 2, 3, 4, and 5, or in two or more parts.

The shape and configuration of the milling-cutters are arranged according to the size, length, and shape required for the finished axle, by which the point 6 is formed by the section 5, the spindle 7 by section 4, the swell 8 by section 3, and the collar 9 by section 2. The outside of the collar 9 is trimmed or finished up by the section 1. The shoulders formed on the axle by the several enlargements from the point 6 to the collar 9 are cut and finished into shape by the several cutting edges or sides of the mill-sections.

It is obvious that various forms and sizes of axles may be milled out from the blanks by arranging the sections of the milling-cutters to cut the required shape. In the operation of milling out the blank axle-arm it is rotated in one direction, the milling-cutters being operated in a direction opposite thereto. The small end 6 of the axle is centered at N, upon which center or pivot it turns.

The arm N' extends through the revolving head O, in which the axle is clamped in a central position and in line with the center N by means of the sliding jaws P P, actuated by the set-screws Q Q', upon the spindle R, which is so fitted in the head O as to be turned at either of the outer ends, Figs. 3 and 4. The axis of the rotating head is in line with the center N.

The screws Q Q' are arranged right and left handed, and are threaded into the jaws P and P, respectively, as seen in Fig. 3. By turning either end of the spindle R the jaws, by the action of the screws, will open and close, as may be required in clamping the axle to the head or releasing it therefrom.

In the interior of the head is a cavity, S, Fig. 5. This cavity or area is for the convenience of inserting or removing the axle from the head, so as to give sufficient room to handle it. On the outer end of the head is secured a concaved tooth or screw wheel, I, fitted to the screw H, by which means, in connection with the belt F, which connects the two pulleys G and E, Fig. 1, motion is conveyed to the screw H from the driving-pulleys B, so as to revolve the head, and also the axle secured therein by the jaws. Simultaneously with this rotation motion is also conveyed to the milling-cutters M by means of the gear D, in connection with the pinion C on the driving-pulley shaft U. The relative motion of the axle to the cutters is much slower, and may be so arranged that the blank or spindle may be reduced to proper form and finish by one revolution.

In the arm A'' of the frame is a slot lengthwise with said arm, and through the slot extends the shank of the bracket K, to which shank is connected a screw-nut, L. By means of the slot the bracket may be moved or adjusted to various lengths of milling-cutters according to the length of the axle, and by means of the nut L the bracket is securely held in proper position for supporting one end of the shaft D', upon which the milling-cutters are secured by means of keys, screw-nuts, or other sufficient device.

The head O revolves in the movable standard V, Figs. 1, 2, 5, which standard is connected to the slide W, forming a sliding standard upon the ways a. To this standard is connected by a nut the adjusting-screw b, provided with a hand wheel or crank, Fig. 1, for turning said screw, thereby moving the standards longitudinally on the slide a, as may be required by the axle in relation to its length, or in placing it in the machine and removing it therefrom. It is, however, especially designed to adjust the head for holding axles of various lengths.

Connected to the frame is a table, c, which is arranged to slide up and down upon ways attached to the frame and operated by means of the screw-shaft d, threaded in the bracket e, which bracket is fastened to the frame. The upper end of the screw is pivoted to the under side of the table at f, Fig. 2.

Upon the shaft is keyed the bevel-gear g, which meshes into a pinion, h, its shaft being journaled in the side of the table and provided with a hand-wheel or its equivalent for turning said pinion.

On turning the wheel i, motion is conveyed to the screw-shaft d, the turning of which causes the table to move up or down. This function of the machine is for the purpose of raising and lowering the axle to or from the milling-cutters M, so as to adjust the axle-blank to the cutters according to its size or diameter; hence the axle-blank, by this arrangement, can be adjusted longitudinally, as its length may require, by means of the sliding head, and also vertically, according to the diameter of the axle, by raising it to or lowering it from the milling-cutters by operating the screw-shaft d, as before described.

The raising and lowering of the axle may be so gaged by a stop or stops attached to the frame as to arrest the elevation of the table at any given point; hence the blank axles, when placed in the machine for milling the table, will raise only to the given point required for the diameter of the axle. By this means all the axles designed to be of the same diameter and length will have a uniform standard size ready for the box without further fitting, which cannot be readily attained in the ordinary mode of turning down the blank.

The axle-blank, before being placed in the machine for milling, may be forged out in the same way and to the same extent as for turning by the ordinary means.

What I claim as my invention, and desire to secure by Letters Patent, is—

1. The combination, substantially as hereinbefore described, of the chuck P, its head O, and the hollow sleeve, the mechanism for slowly revolving said chuck, and the more rapidly-revolving milling-tool, for shaping the arms or spindles of axle-blanks to their required form and dimensions.

2. The combination, substantially as hereinbefore described, of the rest N, the chuck P, the mechanism for slowly revolving the chuck, and the complex milling-tool having a contour adapted to shape the arms or spindles of axle-blanks and adjacent portions thereof.

3. The combination, substantially as hereinbefore described, of the rapidly-revolving milling-tool, the standard for supporting the end of the axle, the axle-chuck containing jaws and their set-screws, the sliding bed on which the standard and the chuck are mounted, mechanism for moving the bed toward and from the milling-tool, and the mechanism for slowly revolving the chuck.

JACOB KRITCH.

Witnesses:
K. E. KRITCH,
E. C. BACON.